Patented Jan. 8, 1935

1,986,801

UNITED STATES PATENT OFFICE 1,986,801

COLORATION OF CELLULOSE DERIVATIVES

George Holland Ellis, Spondon, near Derby, England, assignor to Celanese Corporation of America, a corporation of Delaware No Drawing. Application September 17, 1929, Serial No. 393,311. In Great Britain October 5, 1928

11 Claims. (Cl. 8—5)

This invention relates to the dyeing, printing, stencilling or otherwise coloring of threads, yarns, netted or woven fabrics, or other products made with or containing cellulose acetate or other cellulose esters or ethers.

In prior U. S. Patents Nos. 1,618,415 and 1,679,935 processes are described for obtaining colorations upon materials made with or containing cellulose acetate by means of nitro derivatives of compounds containing two or more aryl residues linked in any desired manner.

I have now found that valuable colorations upon materials made with or containing cellulose acetate or any other esters or ethers of cellulose may be obtained by means of water insoluble mono-azo, disazo, trisazo dyes etc., obtainable from amino-nitro compounds containing two or more aryl residues linked in any desired manner by diazotizing and coupling respectively with 1, 2, 3 or more molecules of the same or different coupling components.

As compared with the colorations on such materials obtained with the azo dyestuffs from the corresponding unnitrated amines, for example the benzidine disazo colors, the colorations of the present invention are of greater utility on account of the color throw towards the more valuable high frequency end of the spectrum, and furthermore the dyestuffs have in general superior affinity for the fibres under treatment.

The azo dyes to be applied according to the present invention are unsulphonated dyestuffs. They may be applied to the materials in substance or may be produced on the materials, for example by applying one or more of the amino derivatives referred to above, diazotizing upon the material and developing or by applying a coupling component and developing with a diazo solution obtained from the amino derivatives referred to. Mono- and dis-azo colors may be applied either in substance or formed on the material, while trisazo and other polyazo colors are preferably formed on the material.

As stated above the amino-nitro compounds may contain two or more aryl residues linked in any desired manner. For example they may be linked directly as in nitro-benzidine, 2:2'- or 3:3'-dinitro-benzidine, 5 - nitro-ortho-tolidine, 5:5'-dinitro-ortho-tolidine, 6:6'-dinitro-o-dianisidine and 4-nitro-4'-amino-diphenyl; by means of an atom of oxygen as for example in 3-nitro-4-amino-diphenyl ether and 3-nitro-2-amino-diphenyl ether; by means of an atom of sulphur as for example in 4-amino-4'-nitro-diphenyl sulphide and 4:4'-diamino-3:3'-dinitrodiphenyl sulphone; by means of an atom of nitrogen as in 2:4-dinitro-3'-aminodiphenylamine, 2:4 - dinitro-4'-aminodiphenylamine, 4-chlor-2-nitro-4'-aminodiphenylamine, 2 - nitro-4'-aminodiphenylamine, 4 - nitro-4' - aminodiphenylamine, 2 - nitro - 4 - aminodiphenylamine and 2-nitro-4-amino-4'-methyl-diphenylamine (condensation of 3-nitro-4-chlor-acetanilide with p-toluidine and hydrolysis of product); by means of an atom of carbon as for example in 5-nitro-2 - amino-benzophenone, 3-nitro-4-amino-benzophenone, 2-nitro-2'-amino-benzophenone, 4:4'-diamino - 3:3'-dinitro-benzophenone, 4:4' - diamino-2-nitro-diphenyl-methane, 4:4'-diamino-2:2'-dinitro-diphenyl-methane, 4:4' - diamino-3:3'-dinitro - diphenyl - methane and tri- (2-nitro-4-aminophenyl) - methane; or by any other linking atoms, or by any combination of linking atoms or of linking atoms and direct linkages, as for example by means of an atom of nitrogen and an atom of carbon as in 2-amino-5-nitrobenzanilide, 4-nitro-benzyl-2-amino - 5 - nitroaniline, 4-nitro-benzoyl-para-phenylene-diamine and 4:4'-diamino-2:2'-dinitro-diphenyl urea.

Any suitable coupling components may be employed either for producing the dyestuff in substance to be applied to the fibre, or for producing dyestuffs on the fibre, and the following are given by way of example only:—xylidines, cresidines, anisidines, phenetidines, metatoluidine, metaphenylenediamine, nitro-metaphenylenediamine, alkyl- aryl- or aralkyl-anilines, phenols, cresols, resorcinol, amino-phenols, or alkylaminophenols, such as dimethyl-meta-aminophenol, α- or β-naphthylamines or alkyl derivatives thereof, or naphthylamine ethers, ω-oxy-ethyl-α-naphthylamine, γ-chlor-β-oxy-propyl-α naphthylamine (condensation of epichlorhydrin with α-naphthylamine), amino-naphthoic acids, aminonaphthols, or any compounds obtained by the acetylation or other acidylation of amino-groups in the said coupling components.

The azo-dyestuffs according to the present invention may contain, in addition to the groups previously specified any other desired substituent groups, for example nitro, amino, alkylamino, acidylamino, alkyl, alkoxy, hydroxy, carboxy, halogen and mercapto groups.

The following are a few examples of azo-dyestuffs which may be applied according to the present invention, but it is to be understood that the listing of these examples implies no limitation whatever of the invention thereto:—

| Component | Diazotized and coupled with— | Shade |
|---|---|---|
| 2:4-dinitro-4′-amino-diphenylamine | Phenol | Golden yellow. |
| Do | Meta-toluidine | Golden orange. |
| Do | Dimethylaniline | Pale golden orange. |
| Do | Meta-phenylene-diamine | Pale brown. |
| Do | Resorcinol | Golden yellow. |

(The shades obtained with the corresponding 3′-amino compounds are somewhat yellower.)

| | | |
|---|---|---|
| 2:2′-dinitro-benzidine | Meta-toluidine (2 mols) | Golden orange. |
| Do | Cresidine (2 mols) | Brownish orange. |
| 4-nitro-4′-aminodiphenyl | Meta-phenylenediamine | Orange brown. |
| 3:3′-dinitro-4:4′-diaminodiphenylmethane | Meta-toluylene diamine (2 mols) | Golden brown. |
| 3-nitro-4-aminophenyl-ether | α-naphthylamine | Bluish-red. |

The dyestuffs to be applied in substance, or the components (for forming the dyes on the fibre) where insufficiently soluble in water, may be applied to the goods in aqueous suspension or dispersion, obtained, for example, by colloidal grinding with or without dispersing agents or protective colloids, by dissolving in a solvent and mixing with water containing or not containing a protective colloid, by pretreating with dispersing agents or by other methods. As dispersing agents suitable for obtaining such dispersions those described in prior U. S. Patents Nos. 1,618,413, 1,618,-414, 1,694,413 and U. S. specifications Nos. 134,138 of 7th September, 1926 and 176,289 of 17th March, 1927 may be instanced, viz., higher fatty acids or sulphonated or other derivatives thereof containing salt forming groups, such as sulphoricinoleic acid or other sulphated fatty acids or salts of such acids or bodies, for instance their alkali or ammonium salts, used alone or in conjunction with auxiliary solvents as described in U. S. Patent No. 1,690,481 and U. S. specification No. 152,517 of 3rd December, 1926; carbocyclic compounds containing in their structure one or more sulphonic or other salt-forming groups or salts of such compounds; sulpho-aromatic fatty acids or salts thereof; and soluble resin soaps or salts of resin acids. The compositions of matter containing the relatively water insoluble azo dyestuffs and dispersing agents and/or protective colloids are included as part of the present invention.

The following examples illustrate the application of the dyestuffs but are not to be considered as limiting the invention:—

*Example 1*

To dye a golden yellow shade on 10 kilos of cellulose acetate knit fabric:—

100 grams of the finely ground dyestuff obtained by coupling diazotized 2:4-dinitro-4′-aminodiphenylamine with phenol in alkaline solution are well stirred into 1 kilo of Turkey red oil (50%) and the mixture heated with stirring until a good dispersion is obtained. It is then diluted with boiling soft water, and passed through a filter cloth into a dyebath containing 300 litres of soft water. The material is entered, and dyeing carried out as usual, the temperature being raised slowly to 80° C. and maintained thereabouts until the desired shade is achieved. The goods are now lifted, rinsed, and dried or otherwise treated as requisite.

*Example 2*

To dye a bluish red shade on 10 kilos of cellulose acetate yarn in hank form:—

400 grams of a 25% paste of the dyestuff obtained by coupling diazotized 3-nitro-4-aminodiphenyl ether with α-naphthylamine in acid solution are stirred with 500 grams of the sulphoaromatic fatty acid product prepared according to Example A of U. S. Patent No. 1,694,413. The mixture is heated at 95° C. until the maximum degree of dispersion is achieved, and then diluted with boiling water and added through a sieve into a dyebath containing 300 litres of water. The goods are now entered and processed, the temperature being raised slowly to 80° C., and maintained thereabouts until the desired shade is achieved. They are now lifted, rinsed, and dried or otherwise treated as requisite.

*Example 3*

To dye a golden orange shade on 10 kilos of cellulose acetate woven fabric:—

400 grams of a 25% paste of the dyestuff obtained by tetrazotizing 2:2′-dinitro-benzidine and coupling in acid solution with m-toluidine are stirred into 500 grams of a dispersion of two parts of cyclohexanol in ten parts of Turkey red oil (50%). The mixture is heated to 95° C., diluted with boiling soft water, and added through a sieve into a suitable machine containing 300 litres of soft water. The goods are now entered, and the temperature raised during ½ hour to 80° C., and maintained thereabouts for 1–1½ hours or until the desired shade is achieved. They are now lifted, rinsed and dried or otherwise treated as requisite.

*Example 4*

To dye an orange-brown shade on 10 kilos of cellulose acetate knit fabric:—

100 grams of finely ground 4-nitro-4′-aminodiphenyl are dispersed in 1 kilo of Turkey red oil (50%) and applied to the cellulose acetate knit fabric exactly as described in Example 1 above. When sufficient of the nitroamine has been absorbed, the goods are lifted, rinsed and entered into a diazotizing bath of 150 litres containing 500 grams of sodium nitrite (98%) and 1600 ccs. of hydrochloric acid (28° Tw.). They are worked for half an hour in the cold and then lifted, rinsed and entered into a 200–300 litre bath containing 200 grams of m-phenylenediamine and 50 grams of soda ash. When the shade is fully developed the goods are lifted, rinsed and dried or otherwise treated as requisite.

*Example 5*

To dye a fast black shade on 10 kilos of cellulose acetate knit fabric:—

150 grams of finely ground 5-nitro-o-tolidine are dispersed in 1 kilo of Turkey red oil (50%) and applied to the cellulose acetate knit fabric exactly as described in Example 1 above. When exhaustion is complete the goods are lifted, rinsed, and entered into a tetrazotizing bath of 150 litres containing 500 grams of sodium nitrite (98%) and 1600 ccs. of hydrochloric acid (28° Tw.). They are worked for half and hour in the cold and then lifted, rinsed, and entered into a coupling bath containing 200 grams of α-naphthylamine dispersed in 300 litres of cold soft water by a pretreatment with 1 kilo of Turkey red oil (50%). When coupling is complete the goods are lifted, rinsed, and again entered into a tetrazotizing bath prepared as before. After working for half an hour in this bath they are lifted, rinsed, and entered into a coupling bath prepared as follows:—

300 grams of β-oxynaphthoic acid are dissolved in sufficient water containing 150 grams of caustic soda. The solution is then poured into 300 litres of soft water containing 500 grams of glue in solution. To this bath is now added slowly, and with stirring, sufficient acetic acid to give the solution a faintly acid reaction.

The goods are now entered and the bath raised to 40° C., during half an hour and maintained thereabouts for a further hour. The fabric is now lifted, rinsed, and dried or otherwise treated as requisite.

*Example 6*

To dye a golden brown shade on 10 kilos of cellulose acetate knit fabric:—

100 grams of finely ground 3:3'-dinitro-4:4'-diamino-diphenylmethane are dispersed in 1 kilo of Turkey red oil (50%) and applied to the cellulose acetate fabric exactly as described in Example 1 above. When absorption of the nitroamine is complete the goods are lifted, rinsed, and entered into a tetrazotizing bath of 150 litres containing 500 grams sodium nitrite (98%) and 1600 ccs. of hydrochloric acid (28°Tw.). They are worked for 1–1½ hours in the cold and then lifted, rinsed, and entered into a 200–500 litre bath containing 200 grams of m-toluylene-diamine in solution. When the shade is fully developed the goods are lifted, rinsed, and dried or otherwise treated as requisite.

Though the invention has been described above more particularly with regard to obtaining colorations on cellulose acetate materials it is applicable to obtaining colorations on materials made of other esters of cellulose, for example cellulose formate, propionate or butyrate or the products obtained by the treatment of alkalized cellulose with esterifying agents (e. g. the product known as "immunized cotton" obtained with p-toluene-sulpho-chloride), or made of cellulose ethers for instance methyl, ethyl, or benzyl cellulose, or the corresponding condensation products of cellulose and glycols or other polyhydric alcohols, and further to mixed goods containing for example, in addition to the ester or ether of cellulose, cotton, silk or the cellulosic type of artificial silk or other threads or fibres. In dyeing or otherwise coloring such mixed goods, other dyestuffs or components may be employed for the threads or fibres used in association according to their character.

What I claim and desire to secure by Letters Patent is:—

1. Process for the coloration of materials containing organic derivatives of cellulose, comprising coloring the materials with water-insoluble azo dyes obtained by diazotizing and coupling bodies of the type $R_1$—X—$R_2$, where $R_1$ and $R_2$ represent aryl radicles and X represents a direct bond or NH, CO, $CH_2$, $CH_2NH$, CO.NH, or NH.CO.NH, the radicles $R_1$ and $R_2$ together containing at least one nitro group and at least one diazotizable amino group.

2. Process for the coloration of materials containing cellulose acetate, comprising coloring the materials with water-insoluble azo dyes obtained by diazotizing and coupling bodies of the type $R_1.X.R_2$, where $R_1$ and $R_2$ represent aryl radicles and X represents a direct bond or

NH,CO,$CH_2$,$CH_2NH$,CO.NH, or NH.CO.NH, the radicles $R_1$ and $R_2$ together containing at least one nitro group and at least one diazotizable amino group.

3. Process for the coloration of materials containing organic derivatives of cellulose, comprising coloring the materials with water-insoluble azo dyes obtained by diazotizing and coupling bodies of the type $R_1.X.R_2$, where $R_1$ and $R_2$ represent phenyl radicles and X represents a direct bond or NH,CO,$CH_2$,$CH_2NH$,CO.NH, or NH.CO.NH, the radicles $R_1$ and $R_2$ together containing at least one nitro group and at least one diazotizable amino group.

4. Process for the coloration of materials containing cellulose acetate, comprising coloring the materials with water insoluble azo dyes obtained by diazotizing and coupling bodies of the type $R_1.X.R_2$, where $R_1$ and $R_2$ represent phenyl radicles and X represents a direct bond or NH,CO,$CH_2$,$CH_2NH$,CO.NH, or NH.CO.NH, the radicles $R_1$ and $R_2$ together containing at least one nitro group and at least one diazotizable amino group.

5. Process for the coloration of materials containing organic derivatives of cellulose, comprising applying to the materials amino-nitro compounds of the type $R_1.X.R_2$, where $R_1$ and $R_2$ represent phenyl radicles and X represents a direct bond or NH,CO,$CH_2$, $CH_2NH$,CO.NH, or NH.CO.NH, the radicles $R_1$ and $R_2$ together containing at least one nitro group and at least one diazotizable amino group, diazotizing on the materials and coupling to form a water insoluble azo dyestuff.

6. Process for the coloration of materials containing cellulose acetate, comprising applying to the materials amino-nitro compounds of the type $R_1.X.R_2$, where $R_1$ and $R_2$ represent phenyl radicles and X represents a direct bond or NH,CO,$CH_2$,$CH_2NH$, CO.NH, or NH.CO.NH, the radicles $R_1$ and $R_2$ together containing at least one nitro group and at least one diazotizable amino group, diazotizing on the material and coupling to form a water insoluble azo dyestuff.

7. Process for the coloration of materials containing organic derivatives of cellulose, comprising coloring the materials with aqueous dispersions of the azo dyes obtained by diazotizing and coupling amino-nitro compounds of the type $R_1.X.R_2$ where $R_1$ and $R_2$ represent phenyl radicles and X represents a direct bond or NH,CO,$CH_2$,$CH_2NH$,CO.NH, or NH.CO.NH, the radicles $R_1$ and $R_2$ together containing at least one nitro group and at least one diazotizable amino group.

8. Process for the coloration of materials containing cellulose acetate, comprising coloring the materials with aqueous dispersions of the azo dyes obtained by diazotizing and coupling amino-nitro compounds of the type $R_1.X.R_2$, where $R_1$ and $R_2$ represent phenyl radicles and X represents a direct bond or NH,CO,$CH_2$,$CH_2NH$,CO.NH, or NH.CO.NH, the groups $R_1$ and $R_2$ together containing at least one nitro group and at least one diazotizable amino group.

9. Process for the coloration of materials containing organic derivatives of cellulose which comprises coloring the materials with water-insoluble azo dyes obtained by diazotizing and coupling bodies of the type $R_1.X.R_2$, where $R_1$ and $R_2$ represent aryl radicles and X represents a direct bond or NH,CO,CH$_2$,CH$_2$NH,CO.NH,NH.CO.NH, or O, the radicles $R_1$ and $R_2$ together containing at least one nitro group in an ortho position to at least one diazotizable amino group.

10. Process for the coloration of materials containing organic derivatives of cellulose which comprises coloring the materials with water-insoluble azo dyes obtained by diazotizing and coupling bodies of the type $R_1.X.R_2$, where $R_1$ and $R_2$ represent phenyl radicles and X represents a direct bond or NH,CO,CH$_2$,CH$_2$NH,CO.NH, NH.CO.NH, or O, the radicles $R_1$ and $R_2$ together containing at least one nitro group in an ortho position to at least one diazotizable amino group.

11. Process for the coloration of materials containing cellulose acetate which comprises coloring the materials with water-insoluble azo dyes obtained by diazotizing and coupling bodies of the type $R_1.X.R_2$, where $R_1$ and $R_2$ represent phenyl radicles and X represents a direct bond or NH,CO,CH$_2$,CH$_2$NH,CO.NH,NH.CO.NH, or O, the radicles $R_1$ and $R_2$ together containing at least one nitro group in an ortho position to at least one diazotizable amino group.

GEORGE HOLLAND ELLIS.